(12) United States Patent
Hu (10) Patent No.: US 10,817,469 B2
(45) Date of Patent: Oct. 27, 2020

(54) METHOD AND APPARATUS FOR REPAIRING FILE SYSTEM DIRECTORY TREE

(71) Applicant: Huawei Technologies Co., Ltd., Shenzhen (CN)

(72) Inventor: Bo Hu, Chengdu (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 234 days.

(21) Appl. No.: 15/962,659

(22) Filed: Apr. 25, 2018

(65) Prior Publication Data

US 2018/0239774 A1 Aug. 23, 2018

Related U.S. Application Data

(63) Continuation of application No. PCT/CN2016/102601, filed on Oct. 19, 2016.

(30) Foreign Application Priority Data

Oct. 26, 2015 (CN) .......................... 2015 1 0701327

(51) Int. Cl.
*G06F 16/13* (2019.01)
*G06F 16/14* (2019.01)
(Continued)

(52) U.S. Cl.
CPC .......... *G06F 16/13* (2019.01); *G06F 11/1435* (2013.01); *G06F 16/14* (2019.01);
(Continued)

(58) Field of Classification Search
CPC ........ G06F 16/10; G06F 16/185; G06F 16/13; G06F 16/2365; G06F 16/9017; G06F 16/11; G06F 16/14
(Continued)

(56) References Cited

U.S. PATENT DOCUMENTS 5,875,444 A 2/1999 Hughes
7,707,193 B2 * 4/2010 Zayas ..................... G06F 16/10
707/691

(Continued)

FOREIGN PATENT DOCUMENTS

CN 1786944 A 6/2006
CN 1959649 A 5/2007
(Continued)

OTHER PUBLICATIONS

Han W. et al., "Algorithm Research for Designing a Content Tree Rapidly," Science Technology and Engineering, vol. 3, No. 20, Oct. 2009, 3 pages.

(Continued)

*Primary Examiner* — Dangelino N Gortayo
(74) *Attorney, Agent, or Firm* — Hauptman Ham, LLP (57) ABSTRACT

A method and an apparatus for repairing a file system directory tree are provided. Parent directory path information is added to metadata of each directory. When metadata of a directory tree is corrupted, the metadata is traversed, and N subdirectory trees are constructed according to subdirectory path information in the metadata of each directory. A corrupted directory is determined according to parent directory path information of a sub-root directory of a subdirectory tree. Metadata of a higher-level directory of a level R that is adjacent to the sub-root directory is reconstructed according to the parent directory path information of the sub-root directory of the subdirectory tree. The N subdirectory trees are constructed into one directory tree according to the reconstructed metadata of the higher-level directory of the level R that is adjacent to the sub-root directory.

21 Claims, 5 Drawing Sheets

(51) Int. Cl.

| | |
|---|---|
| *G06F 16/16* | (2019.01) |
| *G06F 16/17* | (2019.01) |
| *G06F 16/907* | (2019.01) |
| *G06F 16/23* | (2019.01) |
| *G06F 16/10* | (2019.01) |
| *G06F 16/185* | (2019.01) |
| *G06F 16/901* | (2019.01) |
| *G06F 11/14* | (2006.01) |

(52) U.S. Cl.
CPC .............. *G06F 16/16* (2019.01); *G06F 16/17* (2019.01); *G06F 16/2365* (2019.01); *G06F 16/907* (2019.01); *G06F 16/10* (2019.01); *G06F 16/185* (2019.01); *G06F 16/9017* (2019.01)

(58) Field of Classification Search
USPC .......................... 707/691, 610, 661, 686, 690
See application file for complete search history.

(56) References Cited

U.S. PATENT DOCUMENTS

| | | | |
|---|---|---|---|
| 7,941,709 B1 | 5/2011 | Hong et al. | |
| 9,471,595 B1* | 10/2016 | Vempati | G06F 3/0619 |
| 9,990,253 B1* | 6/2018 | Rajimwale | G06F 11/1435 |
| 10,387,405 B2* | 8/2019 | Doval | G06F 16/185 |
| 2011/0153976 A1 | 6/2011 | Tamura et al. | |
| 2012/0151250 A1* | 6/2012 | Saika | G06F 11/203 714/4.11 |
| 2014/0201163 A1* | 7/2014 | Tipton | G06F 11/1004 707/686 |
| 2018/0276268 A1* | 9/2018 | Doval | G06F 11/0727 |

FOREIGN PATENT DOCUMENTS

| | | |
|---|---|---|
| CN | 101162459 A | 4/2008 |
| CN | 101630322 A | 1/2010 |
| CN | 102226893 A | 10/2011 |
| CN | 103744961 A | 4/2014 |
| CN | 104199888 A | 12/2014 |
| CN | 105607960 A | 5/2016 |
| EP | 1739535 A2 | 1/2007 |
| WO | 9826353 A2 | 6/1998 |

OTHER PUBLICATIONS

Chen, D. et al., "Celerity Algorithm of Building Dynamic Catalogue Tree," Journal of Wuhan University of Technology (Transportation Science and Engineering), vol. 32, No. 1, Feb. 2008, 3 pages.

* cited by examiner

METHOD AND APPARATUS FOR REPAIRING FILE SYSTEM DIRECTORY TREE

CROSS-REFERENCE TO RELATED APPLICATIONS

This application is a continuation of International Application No. PCT/CN2016/102601, filed on Oct. 19, 2016, which claims priority to Chinese Patent Application No. 201510701327.6, filed on Oct. 26, 2015. The disclosures of the aforementioned applications are hereby incorporated by reference in their entireties.

TECHNICAL FIELD

Embodiments of the present invention relate to computer technologies, and in particular, to a method and an apparatus for repairing a file system directory tree.

BACKGROUND

A file system is a method and a data structure that are used by an operating system to define files in a storage device (such as a disk) or a partition, that is, a method for organizing files in a storage device. A software mechanism responsible for managing and storing file information in an operating system is referred to as a file management system, or a file system for short.

Metadata of a file system, which is also referred to as intermediary data or trunk data, is data about data, mainly describes information about a data property, and is used to support functions such as indicating a storage location, recording historical data, resource searching, and file recording. Metadata is also considered as an electronic directory. To compile a directory, content or features of data need to be described and stored, so as to assist data retrieval. Metadata is stored in directories of a file system directory tree. Existing metadata includes subdirectory path information. The subdirectory path information includes a subdirectory identification (ID). When an internal error or a media corruption occurs in a file system, part of metadata may be corrupted. By scanning all uncorrupted metadata, a directory tree is constructed according to the subdirectory path information in the metadata, and isolated metadata is stored in a newly-constructed lost and found directory.

However, an original file system directory tree cannot be recovered using a method in a current system, affecting normal operation of a file system.

SUMMARY

Embodiments of the present invention provide a method and an apparatus for repairing a file system directory tree, so as to reconstruct a file system directory tree, thereby reducing impact caused by a corrupted file system directory tree.

According to a first aspect, an embodiment of the present invention provides a method for repairing a file system directory tree. The method includes traversing metadata, and constructing N subdirectory trees according to subdirectory path information in metadata of each directory, where the subdirectory path information includes an identification ID of a lower-level directory of a current directory, the metadata includes parent directory path information and the subdirectory path information, the parent directory path information includes an ID of a higher-level directory of the current directory, and N is an integer greater than or equal to 2. The method also includes reconstructing, according to parent directory path information in metadata of a sub-root directory of each subdirectory tree, metadata of a higher-level directory of a level R that is adjacent to the sub-root directory, where the sub-root directory is a root directory of the subdirectory tree, and R is an integer greater than or equal to 1. The method also includes constructing the N subdirectory trees into one directory tree according to the reconstructed metadata of the higher-level directory of the level R that is adjacent to the sub-root directory.

That is, the parent directory path information is added to the metadata of each directory; when metadata of a directory tree is corrupted, the metadata is traversed, and the N subdirectory trees are constructed according to the subdirectory path information in the metadata of each directory; and then a corrupted directory is determined according to parent directory path information of a sub-root directory of a subdirectory tree, metadata of a higher-level directory of a level R that is adjacent to the sub-root directory is reconstructed according to the parent directory path information of the sub-root directory of the subdirectory tree, that is, metadata of the corrupted directory is reconstructed, and the N subdirectory trees are constructed into one directory tree according to the reconstructed metadata of the higher-level directory of the level R that is adjacent to the sub-root directory. Therefore, an original file system directory tree is recovered, and impact caused by a corrupted file system directory tree is reduced.

Optionally, the reconstructing, according to parent directory path information in metadata of a sub-root directory of each subdirectory tree, metadata of a higher-level directory of a level R that is adjacent to the sub-root directory includes: if a higher-level directory ID in the metadata of the sub-root directory of the subdirectory tree includes at least one first directory ID, and the first directory ID is identical to a directory ID in another subdirectory tree, determining that a directory ID between an ID of the sub-root directory and a second directory ID is an ID of the higher-level directory of the level R that is adjacent to the sub-root directory, where the second directory ID is an ID, of the lowest-level directory, in the at least one first directory ID; and reconstructing the metadata of the higher-level directory of the level R according to the parent directory path information in the metadata of the sub-root directory.

Optionally, the reconstructing the metadata of the higher-level directory of the level R according to the parent directory path information in the metadata of the sub-root directory includes: for an $i^{th}$-level directory of the higher-level directory of the level R, determining that in an ID of a higher-level directory of the sub-root directory, a directory between the sub-root directory and the $i^{th}$-level directory, and the sub-root directory are subdirectories path information of the $i^{th}$-level directory; and determining that in the ID of the higher-level directory of the sub-root directory, a directory higher than the $i^{th}$-level directory is parent directory path information of the $i^{th}$-level directory, where i is an integer greater than or equal to 1 and less than or equal to R.

Optionally, in the directory tree, in a directory lower than an $S^{th}$-level directory, parent directory path information of each directory includes information about a higher-level directory of a level S, where S is an integer greater than or equal to 2; and parent directory path information of the $S^{th}$-level directory and a directory higher than the $S^{th}$-level directory includes information about all higher-level directories.

According to a second aspect, an embodiment of the present invention provides an apparatus for repairing a file system directory tree. The apparatus includes a processing module, configured to: traverse metadata, and construct N subdirectory trees according to subdirectory path information in metadata of each directory, where the subdirectory path information includes an identification ID of a lower-level directory of a current directory, the metadata includes parent directory path information and the subdirectory path information, the parent directory path information includes an ID of a higher-level directory of the current directory, and N is an integer greater than or equal to 2. The apparatus also includes a reconstruction module, configured to reconstruct, according to parent directory path information in metadata of a sub-root directory of each subdirectory tree, metadata of a higher-level directory of a level R that is adjacent to the sub-root directory, where the sub-root directory is a root directory of the subdirectory tree, and R is an integer greater than or equal to 1, where the reconstruction module is further configured to construct the N subdirectory trees into one directory tree according to the reconstructed metadata of the higher-level directory of the level R that is adjacent to the sub-root directory.

That is, the parent directory path information is added to the metadata of each directory; when metadata of a directory tree is corrupted, the processing module traverses the metadata, and constructs the N subdirectory trees according to the subdirectory path information in the metadata of each directory; and then the reconstruction module determines a corrupted directory according to parent directory path information of a sub-root directory of a subdirectory tree, reconstructs, according to the parent directory path information of the sub-root directory of the subdirectory tree, metadata of a higher-level directory of a level R that is adjacent to the sub-root directory, that is, reconstructs metadata of the corrupted directory, and constructs the N subdirectory trees into one directory tree according to the reconstructed metadata of the higher-level directory of the level R that is adjacent to the sub-root directory. Therefore, an original file system directory tree is recovered, and impact caused by a corrupted file system directory tree is reduced.

Optionally, the reconstruction module is specifically configured to: if a higher-level directory ID in the metadata of the sub-root directory of the subdirectory tree includes at least one first directory ID, and the first directory ID is identical to a directory ID in another subdirectory tree, determine that a directory ID between an ID of the sub-root directory and a second directory ID is an ID of the higher-level directory of the level R that is adjacent to the sub-root directory, where the second directory ID is an ID, of the lowest-level directory, in the at least one first directory ID; and reconstruct the metadata of the higher-level directory of the level R according to the parent directory path information in the metadata of the sub-root directory.

Optionally, the reconstruction module is specifically configured to: for an $i^{th}$-level directory of the higher-level directory of the level R, determine that in an ID of a higher-level directory of the sub-root directory, a directory between the sub-root directory and the $i^{th}$-level directory, and the sub-root directory are subdirectories of the $i^{th}$-level directory; and determine that in the ID of the higher-level directory of the sub-root directory, a directory higher than the $i^{th}$-level directory is parent directory path information of the $i^{th}$-level directory, where i is an integer greater than or equal to 1 and less than or equal to R.

Optionally, in the directory tree, in a directory lower than an $S^{th}$-level directory, parent directory path information of each directory includes information about a higher-level directory of a level S, where S is an integer greater than or equal to 2; and parent directory path information of the $S^{th}$-level directory and a directory higher than the $S^{th}$-level directory includes information about all higher-level directories.

BRIEF DESCRIPTION OF THE DRAWINGS

To describe the technical solutions in the embodiments of the present invention more clearly, the following briefly describes the accompanying drawings required for describing the embodiments or the prior art. Apparently, the accompanying drawings in the following description show merely some embodiments of the present invention, and persons of ordinary skill in the art may still derive other drawings from these accompanying drawings without creative efforts.

DETAILED DESCRIPTION OF ILLUSTRATIVE EMBODIMENTS

The following describes the technical solutions in the embodiments of the present invention with reference to the accompanying drawings in the embodiments of the present invention. Apparently, the described embodiments are merely some but not all of the embodiments of the present invention. All other embodiments obtained by persons of ordinary skill in the art based on the embodiments of the present invention without creative efforts shall fall within the protection scope of the present invention.

In the specification, claims, and accompanying drawings of the present invention, the terms "first", "second", "third", "fourth", and so on (if existent) are intended to distinguish between similar objects but do not necessarily indicate a specific order or sequence. It should be understood that the data termed in such a way are interchangeable in proper circumstances so that the embodiments of the present invention described herein can be implemented in orders except the order illustrated or described herein. Moreover, the terms "include", "contain" and any other variants mean to cover the non-exclusive inclusion, for example, a process, method, system, product, or device that includes a list of steps or units is not necessarily limited to those steps or units, but may include other steps or units not expressly listed or inherent to such a process, method, product, or device.

In the present invention, parent directory path information is added to metadata of each directory; when metadata of a directory tree is corrupted, the metadata is traversed, and N subdirectory trees are constructed according to subdirectory path information in the metadata of each directory, where N is an integer greater than or equal to 2; and then a corrupted directory is determined according to parent directory path information of a sub-root directory of a subdirectory tree, and metadata of the corrupted directory is reconstructed according to the parent directory path information of the sub-root directory of the subdirectory tree. Therefore, an original file system directory tree is recovered, and impact caused by a corrupted file system directory tree is reduced.

In a file system directory tree, in a directory lower than an $S^{th}$-level directory, parent directory path information of each directory includes information about a higher-level directory of a level S, where S is an integer greater than or equal to 2; and parent directory path information of the $S^{th}$-level directory and a directory higher than the $S^{th}$-level directory includes information about all higher-level directories. A root directory is a first-level directory, and lower than the root directory, a previous directory is a higher-level directory of a next directory sequentially.

The following describes the technical solutions of the present invention in detail by using specific embodiments. The following specific embodiments can be combined with each other, and a same or similar concept or process may be not described in detail again in some embodiments.

Figure 1:
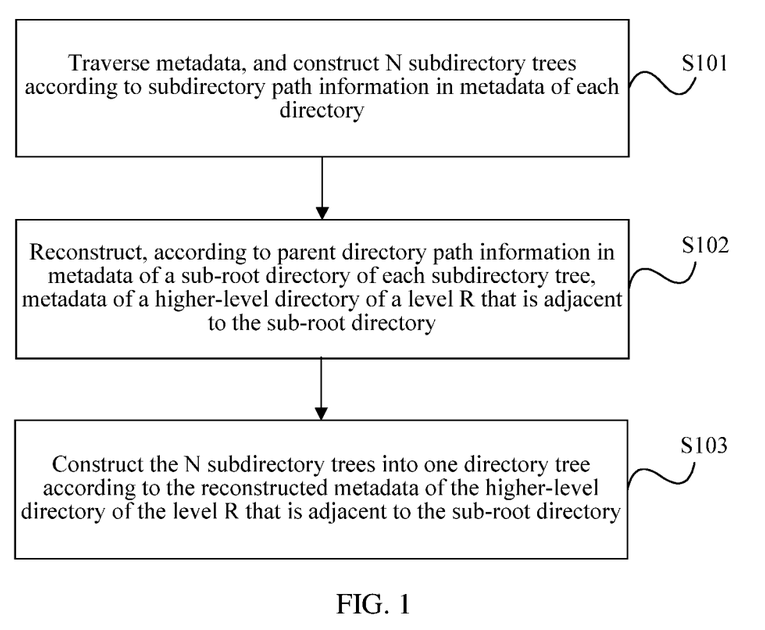
FIG. 1 is a schematic flowchart of Embodiment 1 of a method for repairing a file system directory tree according to the present invention.

FIG. 1 is a schematic flowchart of Embodiment 1 of a method for repairing a file system directory tree according to the present invention. As shown in FIG. 1, the method in this embodiment includes the following steps.

S101: Traverse metadata, and construct N subdirectory trees according to subdirectory path information in metadata of each directory.

The subdirectory path information includes an ID of a lower-level directory of a current directory, the metadata includes parent directory path information and the subdirectory path information, the parent directory path information includes an ID of a higher-level directory of the current directory, and N is an integer greater than or equal to 2.

Figure 2:
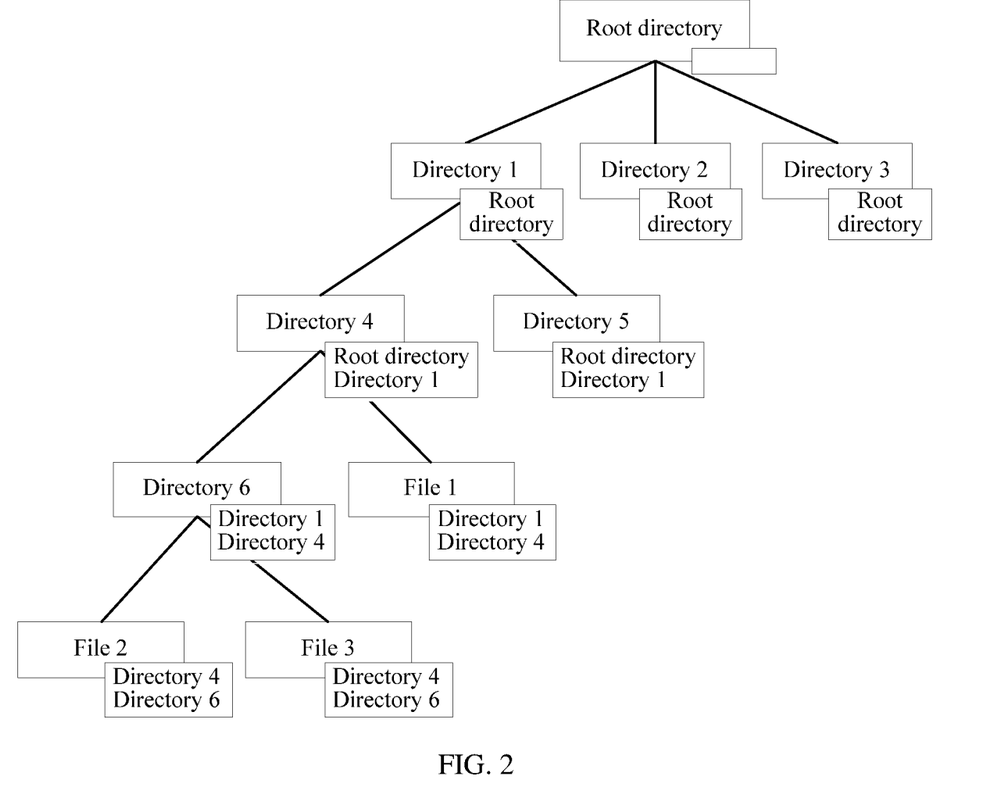
FIG. 2 is a schematic structural diagram of a file system directory tree 1 according to an embodiment of the present invention.

A structure of the file system directory tree is shown in FIG. 2. In FIG. 2, there are directories of five levels, which are sequentially a first level, a second level, a third level, a fourth level, a fifth level, and a sixth level from top to bottom. For each directory, a higher-level directory is a parent directory of the directory, and a lower-level directory is a subdirectory of the directory. For example, for a second-level directory, a first-level directory is a parent directory of the second-level directory, and a third-level directory is a subdirectory of the second-level directory.

Figure 3A:
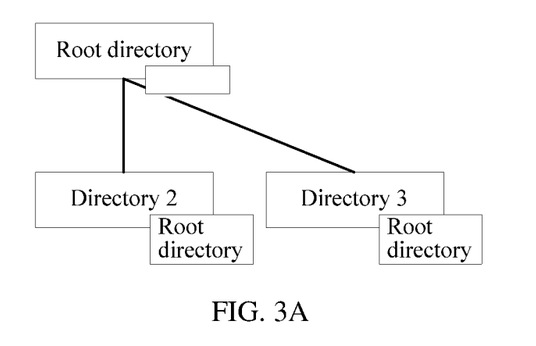
FIG. 3A is a schematic structural diagram of a subdirectory tree 1 of the file system directory tree 1 according to an embodiment of the present invention.
Figure 3B:
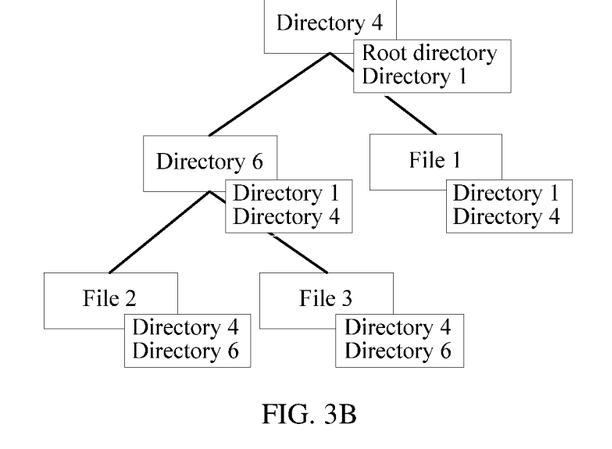
FIG. 3B is a schematic structural diagram of a subdirectory tree 2 of the file system directory tree 1 according to an embodiment of the present invention.
Figure 3C:
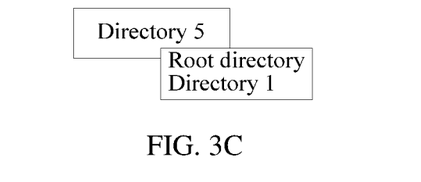
FIG. 3C is a schematic structural diagram of a subdirectory tree 3 of the file system directory tree 1 according to an embodiment of the present invention.

Assuming that a directory 1 in the directory tree shown in FIG. 2 is corrupted, by performing step S101, three subdirectory trees are constructed, and are respectively shown in FIG. 3A, FIG. 3B, and FIG. 3C.

S102: Reconstruct, according to parent directory path information in metadata of a sub-root directory of each subdirectory tree, metadata of a higher-level directory of a level R that is adjacent to the sub-root directory.

The sub-root directory is a root directory of the subdirectory tree, and R is an integer greater than or equal to 1.

For an ith-level directory of the higher-level directory of the level R, it is determined that in an ID of a higher-level directory of the sub-root directory, a directory between the sub-root directory and the ith-level directory, and the sub-root directory are subdirectories of the ith-level directory; and it is determined that in the ID of the higher-level directory of the sub-root directory, a directory higher than the ith-level directory is parent directory path information of the ith-level directory, where i is an integer greater than or equal to 1 and less than or equal to R.

Specifically, if a higher-level directory ID in the metadata of the sub-root directory of the subdirectory tree includes at least one first directory ID, and the first directory ID is identical to a directory ID in another subdirectory tree, it is determined that a directory ID between an ID of the sub-root directory and a second directory ID is an ID of the higher-level directory of the level R that is adjacent to the sub-root directory, where the second directory ID is an ID, of the lowest-level directory, in the at least one first directory ID; and then the metadata of the higher-level directory of the level R is reconstructed according to the parent directory path information in the metadata of the sub-root directory.

With reference to FIG. 3A, FIG. 3B, and FIG. 3C, a higher-level directory ID in metadata of a sub-root directory of a subdirectory tree corresponding to FIG. 3A is empty; a higher-level directory ID in metadata of a sub-root directory of a subdirectory tree corresponding to FIG. 3B is a directory 1 and a root directory, where the root directory is a higher-level directory of the directory 1; and a higher-level directory ID in metadata of a sub-root directory of a subdirectory tree corresponding to FIG. 3C is a directory 1 and a root directory, where the root directory is a higher-level directory of the directory 1.

It can be learned that an ID of the root directory included in the higher-level directory ID in the metadata of the sub-root directory in the subdirectory tree corresponding to FIG. 3B is identical to an ID of the root directory in the subdirectory tree corresponding to FIG. 3A. Therefore, it is determined that the directory 1 between a directory 4 and the root directory is a higher-level directory that is adjacent to the directory 4, and metadata of the directory 1 is reconstructed according to parent directory information in metadata of the directory 4. That is, a higher-level it is determined, according to the fact that the higher-level directory of the directory 4 is the directory 1, that a higher-level directory of the directory 1 is a root directory. It is determined that the directory 1 is the higher-level directory of the directory 4, a lower-level directory of the directory 1 is the directory 4, and the higher-level directory of the directory 1 is the root directory.

Similarly, it can be learned that an ID of the root directory included in the higher-level directory ID in the metadata of the sub-root directory of the subdirectory tree corresponding to FIG. 3C is identical to the ID of the root directory in the subdirectory tree corresponding to FIG. 3A. Therefore, it is determined that the directory 1 between a directory 5 and the root directory is a higher-level directory that is adjacent to the directory 5, and metadata of the directory 1 is reconstructed according to parent directory information in metadata of the directory 5. That is, a higher-level directory of the directory 1 is a root directory according to the fact that the higher-level directory of the directory 5 is the directory 1. It is determined that the directory 1 is the higher-level directory of the directory 5, a lower-level directory of the directory 1 is the directory 5, and the higher-level directory of the directory 1 is the root directory.

S103: Construct the N subdirectory trees into one directory tree according to the reconstructed metadata of the higher-level directory of the level R that is adjacent to the sub-root directory.

It is determined, according to parent directory path information in the metadata of the sub-root directories of the subdirectory trees corresponding to FIG. 3B and FIG. 3C, that a corrupted directory is the directory 1, and the metadata of the directory 1 is reconstructed. The higher-level directory of the directory 1 is the root directory, and the lower-level directories of the directory 1 are the directory 4 and the directory 5. Therefore, the subdirectory trees in FIG. 3B and FIG. 3C are placed below a reconstructed directory 1 of the subdirectory tree in FIG. 3A, as shown in FIG. 2.

In this embodiment, the parent directory path information is added to the metadata of each directory; when metadata of a directory tree is corrupted, the metadata is traversed, and the N subdirectory trees are constructed according to the subdirectory path information in the metadata of each directory; and then a corrupted directory is determined according to parent directory path information of a sub-root directory of a subdirectory tree, metadata of a higher-level directory of a level R that is adjacent to the sub-root directory is reconstructed according to the parent directory path information of the sub-root directory of the subdirectory tree, that is, metadata of the corrupted directory is reconstructed, and the N subdirectory trees are constructed into one directory tree according to the reconstructed metadata of the higher-level directory of the level R that is adjacent to the sub-root directory. Therefore, an original file system directory tree is recovered, and impact caused by a corrupted file system directory tree is reduced.

In the file system directory tree shown in FIG. 2, parent directory path information of each directory includes two higher-level directories; a directory having higher-level directories of less than two levels includes all higher-level directories; and a root directory includes no higher-level directory. FIG. 2 is merely an example, and persons skilled in this art may understand that based on the concept of the present invention, the parent directory path information may further include directories of more than two levels, and an implementation principle is reconstructing metadata of a corrupted directory according to the parent directory path information. A similar technical effect is achieved, and details are not described herein again.

Figure 4:
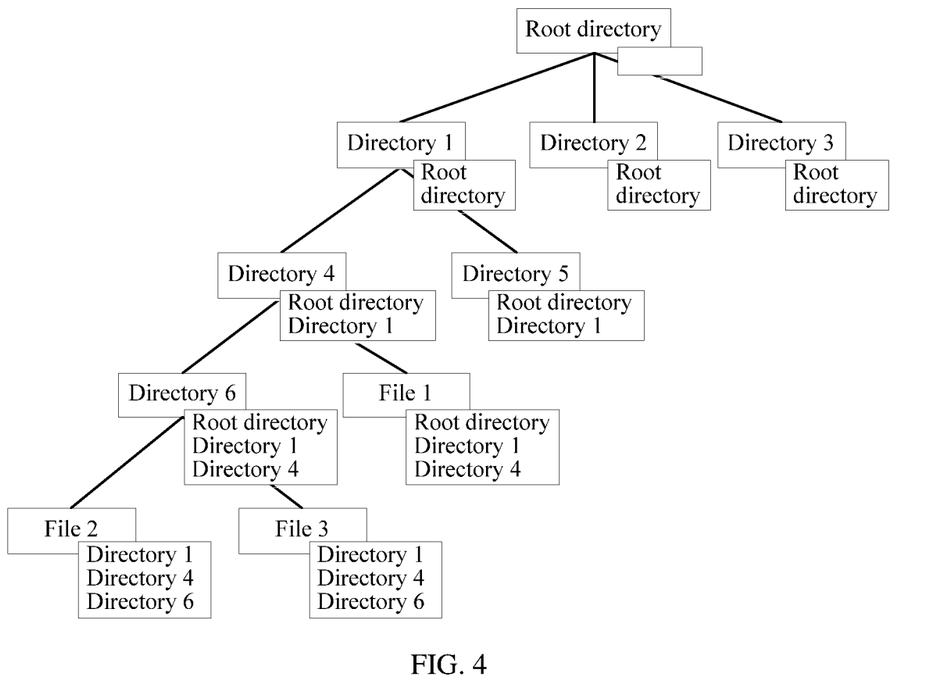
FIG. 4 is a schematic structural diagram of a file system directory tree 2 according to an embodiment of the present invention.
Figure 5A:
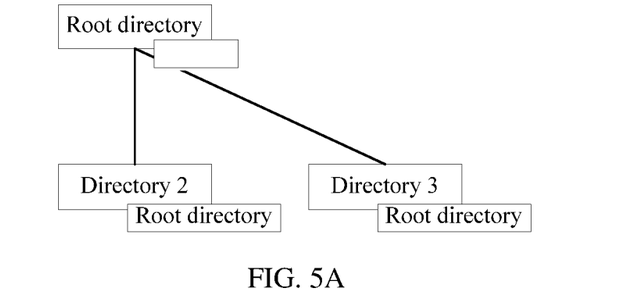
FIG. 5A is a schematic structural diagram of a subdirectory tree 1 of the file system directory tree 2 according to an embodiment of the present invention.
Figure 5B:
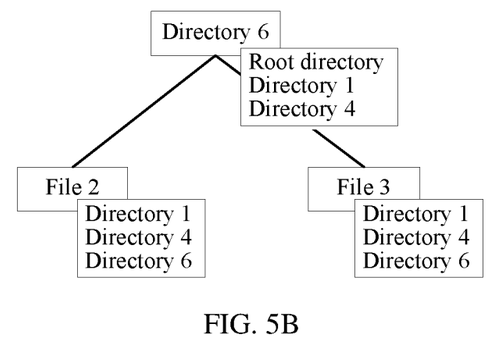
FIG. 5B is a schematic structural diagram of a subdirectory tree 2 of the file system directory tree 2 according to an embodiment of the present invention.
Figure 5C:
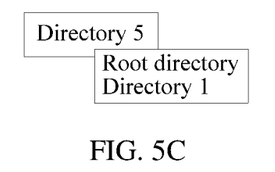
FIG. 5C is a schematic structural diagram of a subdirectory tree 3 of the file system directory tree 2 according to an embodiment of the present invention.
Figure 5D:
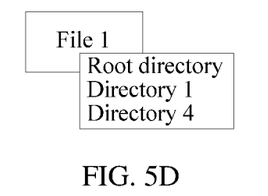
FIG. 5D is a schematic structural diagram of a subdirectory tree 4 of the file system directory tree 2 according to an embodiment of the present invention.

Parent directory path information including higher-level directories of three levels is used as an example below for description. As shown in FIG. 4, it is assumed that a directory 1 and a directory 4 are corrupted. According to step S101, four subdirectory trees are constructed, and are respectively shown in FIG. 5A, FIG. 5B, FIG. 5C, and FIG. 5D. According to step S102, metadata of the directory 1 and metadata of the directory 4 are reconstructed; a higher-level directory in parent directory information of a reconstructed directory 1 is a root directory; and a higher-level directory in parent directory information of a reconstructed directory 4 is the directory 1 and the root directory. A higher-level directory of the directory 4 is the directory 1, and a higher-level directory of the directory 1 is the root directory. According to S103, the directories in FIG. 5A, FIG. 5B, FIG. 5C, and FIG. 5D are constructed into one directory tree, as shown in FIG. 4.

Figure 6:
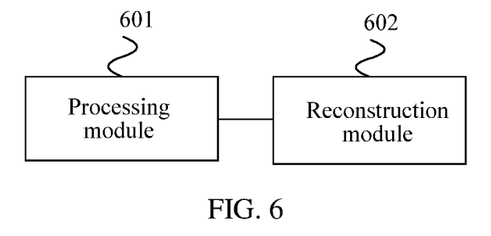
FIG. 6 is a schematic structural diagram of Embodiment 1 of an apparatus for repairing a file system directory tree according to the present invention.

FIG. 6 is a schematic structural diagram of Embodiment 1 of an apparatus for repairing a file system directory tree according to the present invention. The apparatus in this embodiment includes a processing module 601 and a reconstruction module 602. The processing module 601 is configured to: traverse metadata, and construct N subdirectory trees according to subdirectory path information in metadata of each directory, where the subdirectory path information includes an identification ID of a lower-level directory of a current directory, the metadata includes parent directory path information and the subdirectory path information, the parent directory path information includes an ID of a higher-level directory of the current directory, and N is an integer greater than or equal to 2. The reconstruction module 602 is configured to reconstruct, according to parent directory path information in metadata of a sub-root directory of each subdirectory tree, metadata of a higher-level directory of a level R that is adjacent to the sub-root directory, where the sub-root directory is a root directory of the subdirectory tree, and R is an integer greater than or equal to 1. The reconstruction module 602 is further configured to construct the N subdirectory trees into one directory tree according to the reconstructed metadata of the higher-level directory of the level R that is adjacent to the sub-root directory.

In the foregoing embodiment, the reconstruction module 602 is specifically configured to: if a higher-level directory ID in the metadata of the sub-root directory of the subdirectory tree includes at least one first directory ID, and the first directory ID is identical to a directory ID in another subdirectory tree, determine that a directory ID between an ID of the sub-root directory and a second directory ID is an ID of the higher-level directory of the level R that is adjacent to the sub-root directory, where the second directory ID is an ID, of the lowest-level directory, in the at least one first directory ID; and reconstruct the metadata of the higher-level directory of the level R according to the parent directory path information in the metadata of the sub-root directory.

In the foregoing embodiment, the reconstruction module 602 is specifically configured to: for an $i^{th}$-level directory of the higher-level directory of the level R, determine that in an ID of a higher-level directory of the sub-root directory, a directory between the sub-root directory and the $i^{th}$-level directory, and the sub-root directory are subdirectories of the $i^{th}$-level directory; and determine that in the ID of the higher-level directory of the sub-root directory, a directory higher than the $i^{th}$-level directory is parent directory path information of the $i^{th}$-level directory, where i is an integer greater than or equal to 1 and less than or equal to R.

In the foregoing embodiment, in the directory tree, in a directory lower than an $S^{th}$-level directory, parent directory path information of each directory includes information about a higher-level directory of a level S, where S is an integer greater than or equal to 2; and parent directory path information of the $S^{th}$-level directory and a directory higher than the $S^{th}$-level directory includes information about all higher-level directories.

The apparatus in this embodiment may be configured to perform the technical solution in the method embodiment shown in FIG. 1. They have similar implementation principles, and details are not described herein again.

In this embodiment, the parent directory path information is added to the metadata of each directory; when metadata of a directory tree is corrupted, the processing module traverses the metadata, and constructs the N subdirectory trees according to the subdirectory path information in the metadata of each directory; and then the reconstruction module determines a corrupted directory according to parent directory path information of a sub-root directory of a subdirectory tree, reconstructs, according to the parent directory path information of the sub-root directory of the subdirectory tree, metadata of a higher-level directory of a level R that is adjacent to the sub-root directory, that is, reconstructs metadata of the corrupted directory, and constructs the N subdirectory trees into one directory tree according to the reconstructed metadata of the higher-level directory of the level R that is adjacent to the sub-root directory. Therefore, an original file system directory tree is recovered, and impact caused by a corrupted file system directory tree is reduced.

Persons of ordinary skill in the art may understand that all or some of the steps of the method embodiments may be implemented by a program instructing relevant hardware. The program may be stored in a computer-readable storage medium. When the program runs, the steps of the method embodiments are performed. The foregoing storage medium includes: any medium that can store program code, such as a ROM, a RAM, a magnetic disk, or an optical disc.

Finally, it should be noted that the foregoing embodiments are merely intended for describing the technical solutions of the present invention, but not for limiting the present invention. Although the present invention is described in detail with reference to the foregoing embodiments, persons of ordinary skill in the art should understand that they may still make modifications to the technical solutions described in the foregoing embodiments or make equivalent replacements to some or all technical features thereof, without departing from the scope of the technical solutions of the embodiments of the present invention.

What is claimed is:

1. A method, comprising:
   traversing metadata of a plurality of directories;
   constructing N subdirectory trees according to subdirectory path information comprised in metadata of each directory of the plurality of directories, wherein for each directory of the plurality of directories, when a lower-level directory of a respective directory exists, the subdirectory path information of the respective directory comprises an identification (ID) of the lower-level directory of the respective directory, and when a higher-level directory of the respective directory exists, the metadata further comprises parent directory path information of the respective directory, wherein the parent directory path information comprises an ID of the higher-level directory of the respective directory, and N is an integer greater than or equal to 2;
   for each subdirectory tree, when the metadata of a sub-root directory of the respective subdirectory tree includes the parent directory path information, reconstructing, according to the parent directory path information in the metadata of the sub-root directory of the respective subdirectory tree, metadata of a higher-level directory of a level R, wherein each of the N subdirectory trees comprises a respective sub-root directory that is a root directory of the respective subdirectory tree, wherein the higher-level directory of the level R that corresponds to the respective subdirectory tree is adjacent to the sub-root directory of the respective subdirectory tree, and R is an integer greater than or equal to 1; and
   constructing the N subdirectory trees into one directory tree according to each respective reconstructed metadata of the higher-level directory of the level R that is adjacent to the respective sub-root directory.

2. The method according to claim 1, wherein for each subdirectory tree, when the metadata of the sub-root directory of the respective subdirectory tree includes the parent directory path information, reconstructing, according to the parent directory path information in the metadata of the sub-root directory of the respective subdirectory tree, metadata of the higher-level directory of the level R that is adjacent to the sub-root directory of the respective subdirectory tree comprises:
   for each subdirectory tree, when the metadata of the sub-root directory of the respective subdirectory tree includes the parent directory path information, and when the parent directory path information in the metadata of the sub-root directory of the respective subdirectory tree comprises a first directory ID and a second directory ID, and the first directory ID is identical to a directory ID in another subdirectory tree of the N subdirectory trees, determining that the second directory ID is of the higher-level directory of the level R that is adjacent to the sub-root directory of the respective subdirectory tree, wherein the second directory ID is of a lowest-level directory in the parent directory path information in the metadata of the sub-root directory of the respective subdirectory tree; and
   for each subdirectory tree, when the metadata of the sub-root directory of the respective subdirectory tree includes the parent directory path information, reconstructing the metadata of the higher-level directory of the level R according to the parent directory path information in the metadata of the sub-root directory of the respective subdirectory tree.

3. The method according to claim 2, wherein for each subdirectory tree, when the metadata of the sub-root directory of the respective subdirectory tree includes the parent directory path information, reconstructing the metadata of the first directory of the level R according to the parent directory path information in the metadata of the sub-root directory of the respective subdirectory tree comprises:
   for each subdirectory tree, and for an $i^{th}$-level directory that is a higher level directory of the sub-root directory of the respective subdirectory tree, when the metadata of the sub-root directory of the respective subdirectory tree includes the parent directory path information, determining, according to the parent directory path information of the sub-root directory of the respective subdirectory tree, that a first directory and the sub-root directory are subdirectories of the $i^{th}$-level directory, wherein the first directory is between the sub-root directory of the respective subdirectory tree and the $i^{th}$-level directory, and determining, according to the parent directory path information of the sub-root directory of the respective subdirectory tree, that a directory higher than the $i^{th}$-level directory is parent directory of the $i^{th}$-level directory;
   wherein i is an integer greater than or equal to 1 and less than or equal to R.

4. The method according to claim 1, wherein, in the one directory tree, in a directory lower than an $S^{th}$-level directory, parent directory path information of each directory comprises information about a higher-level directory of a level S, wherein S is an integer greater than or equal to 2; and
   wherein, in the one directory tree, parent directory path information of the $S^{th}$-level directory and a directory higher than the $S^{th}$-level directory comprises information about all higher-level directories.

5. The method according to claim 1, wherein
   in the one directory tree, a first directory of the plurality of directories is included in a level S, a second directory of the plurality of directories is included in the level S, a third directory of the plurality of directories in included in a level S-1 that is higher than the level S, and a fourth directory of the plurality of directories in included in a level S+X that is lower than the level S, where S is an integer greater than or equal to 2 and X is an integer greater than or equal to 1, a first subdirectory tree of the N subdirectory trees comprises the second directory and the third directory, and is free from including the first directory, and a second subdirectory tree of the N subdirectory trees comprises the fourth directory and is free from having the first directory, the second directory and the third directory.

6. The method according to claim 5, wherein, in the one directory tree, parent directory path information included in the metadata of the first directory comprises information about the third directory, parent directory path information included in the metadata of the second directory comprises information about the third directory, and parent directory path information included in the metadata of the fourth directory comprises information about the first directory and information about the third directory.

7. The method according to claim 6, wherein
X is an integer greater than or equal to 2, and
in the one directory tree, the parent directory path information included in the metadata of the fourth directory further comprises information each directory of the plurality of directories between the fourth directory and the first directory.

8. The method according to claim 6, wherein the metadata of the first directory is reconstructed, and reconstructing, according to the parent directory path information in the metadata of the sub-root directory of the respective subdirectory tree, metadata of a higher-level directory of a level R, comprises:
identifying the first directory is included in the level S, and is between the fourth directory and the third directory, based on the metadata of the fourth directory.

9. An apparatus, comprising:
a processor; and
a non-transitory computer-readable storage medium storing a program to be executed by the processor, the program including instructions for:
traversing metadata of a plurality of directories;
constructing N subdirectory trees according to subdirectory path information comprised in metadata of each directory of the plurality of directories, wherein for each directory of the plurality of directories, when a lower-level directory of a respective directory exists, the subdirectory path information of the respective directory comprises an identification (ID) of the lower-level directory of the respective directory, and when a higher-level directory of the respective directory exists, the metadata further comprises parent directory path information of the respective directory, wherein the parent directory path information comprises an ID of the higher-level directory of the respective directory, and N is an integer greater than or equal to 2;
for each subdirectory tree, when the metadata of a sub-root directory of the respective subdirectory tree includes the parent directory path information, reconstructing, according to the parent directory path information in the metadata of the sub-root directory of the respective subdirectory tree, metadata of a higher-level directory of a level R, wherein each of the N subdirectory trees comprises a sub-root directory that is a root directory of the respective subdirectory tree, wherein the higher-level directory of the level R that corresponds to the respective subdirectory tree is adjacent to the sub-root directory of the respective subdirectory tree, and R is an integer greater than or equal to 1; and
constructing the N subdirectory trees into one directory tree according to each respective reconstructed metadata of the higher-level directory of the level R that is adjacent to the respective sub-root directory.

10. The apparatus according to claim 9, wherein the program further includes instructions for:
for each subdirectory tree, when the metadata of the sub-root directory of the respective subdirectory tree includes the parent directory path information, and when parent directory path information in the metadata of the sub-root directory of the respective subdirectory tree comprises a first directory ID and a second directory ID, and the first directory ID is identical to a directory ID in another subdirectory tree of the N subdirectory trees, determining that the second directory ID is of the higher-level directory of the level R that is adjacent to the sub-root directory of the respective subdirectory tree, wherein the second directory ID of a lowest-level directory in the parent directory path information in the metadata of the sub-root directory of the respective directory tree; and
for each subdirectory tree, when the metadata of the sub-root directory of the respective subdirectory tree includes the parent directory path information, reconstruct the metadata of the higher-level directory of the level R according to the parent directory path information in the metadata of the sub-root directory of the respective directory tree.

11. The apparatus according to claim 10, wherein the program further includes instructions for:
for each subdirectory tree, and for an $i^{th}$-level directory that is a higher level directory of the sub-root directory of the respective subdirectory tree, when the metadata of the sub-root directory of the respective subdirectory tree includes the parent directory path information, determining, according to the parent directory path information of the sub-root directory of the respective subdirectory tree, that a first directory and the sub-root directory are subdirectories of the $i^{th}$-level directory, wherein the first directory is between the sub-root directory of the respective subdirectory tree and the $i^{th}$-level directory, and determining, according to the parent directory path information of the sub-root directory of the respective subdirectory tree, that a directory higher than the $i^{th}$-level directory is parent directory of the $i^{th}$-level directory;
wherein i is an integer greater than or equal to 1 and less than or equal to R.

12. The apparatus according to claim 9, wherein in the one directory tree, in a directory lower than an $S^{th}$-level directory, parent directory path information of each directory comprises information about a higher-level directory of a level S, wherein S is an integer greater than or equal to 2; and
wherein, in the one directory tree, parent directory path information of the $S^{th}$-level directory and a directory higher than the $S^{th}$-level directory comprises information about all higher-level directories.

13. The apparatus according to claim 9, wherein
in the one directory tree, a first directory of the plurality of directories is included in a level S, a second directory of the plurality of directories is included in the level S, a third directory of the plurality of directories in included in a level S−1 that is higher than the level S, and a fourth directory of the plurality of directories in included in a level S+X that is lower than the level S, where S is an integer greater than or equal to 2 and X is an integer greater than or equal to 1, a first subdirectory tree of the N subdirectory trees comprises the second directory and the third directory, and is free from including the first directory, and a second subdirectory tree of the N subdirectory trees comprises the fourth directory and is free from having the first directory, the second directory and the third directory.

14. The apparatus according to claim 13, wherein, in the one directory tree, parent directory path information included in the metadata of the first directory comprises information about the third directory, parent directory path information included in the metadata of the second directory comprises information about the third directory, and parent directory path information included in the metadata of the fourth directory comprises information about the first directory and information about the third directory.

15. The apparatus according to claim 14, wherein
X is an integer greater than or equal to 2, and
in the one directory tree, the parent directory path information included in the metadata of the fourth directory further comprises information each directory of the plurality of directories between the fourth directory and the first directory.

16. The apparatus according to claim 14, wherein the metadata of the first directory is reconstructed, and reconstructing, according to the parent directory path information in the metadata of the sub-root directory of the respective subdirectory tree, metadata of a higher-level directory of a level R, comprises:
identifying the first directory is included in the level S, and is between the fourth directory and the third directory, based on the metadata of the fourth directory.

17. A non-transitory computer-readable storage medium storing a program to be executed by a processor, the program including instructions for:
constructing N subdirectory trees according to subdirectory path information comprised in metadata of each directory of a plurality of directories, wherein for each directory of the plurality of directories, when a lower-level directory of a respective directory exists, the subdirectory path information of the respective directory comprises an identification (ID) of the lower-level directory of the respective directory, and when a higher-level directory of the respective directory exists, the metadata further comprises parent directory path information of the respective directory, wherein the parent directory path information comprises an ID of the higher-level directory of the respective directory, and N is an integer greater than or equal to 2;
for each subdirectory tree, when the metadata of a sub-root directory of the respective subdirectory tree includes the parent directory path information, reconstructing, according to the parent directory path information in the metadata of the sub-root directory of the respective subdirectory tree, metadata of a higher-level directory of a level R, wherein each of the N subdirectory trees comprises a respective sub-root directory that is a root directory of the respective subdirectory tree, wherein the higher-level directory of the level R that corresponds to the respective subdirectory tree is adjacent to the sub-root directory of the respective subdirectory tree, and R is an integer greater than or equal to 1; and
constructing the N subdirectory trees into one directory tree according to each respective reconstructed metadata of the higher-level directory of the level R that is adjacent to the respective sub-root directory.

18. The non-transitory computer-readable storage medium according to claim 17, wherein the program further includes instructions for:
for each subdirectory tree, when the metadata of the sub-root directory of the respective subdirectory tree includes the parent directory path information, and when the parent directory path information in the metadata of the sub-root directory of the respective subdirectory tree comprises a first directory ID and a second directory ID, and the first directory ID is identical to a directory ID in another subdirectory tree of the N subdirectory trees, determining that the second directory ID is of the higher-level directory of the level R that is adjacent to the sub-root directory of the respective subdirectory tree, wherein the second directory ID is of a lowest-level directory in the parent directory path information in the metadata of the sub-root directory of the respective subdirectory tree; and
for each subdirectory tree, when the metadata of the sub-root directory of the respective subdirectory tree includes the parent directory path information, reconstructing the metadata of the higher-level directory of the level R according to the parent directory path information in the metadata of the sub-root directory of the respective subdirectory tree.

19. The non-transitory computer-readable storage medium according to claim 18, wherein the program further includes instructions for:
for each subdirectory tree, and for an $i^{th}$-level directory that is a higher level directory of the sub-root directory of the respective subdirectory tree, when the metadata of the sub-root directory of the respective subdirectory tree includes the parent directory path information, determining, according to the parent directory path information of the sub-root directory of the respective subdirectory tree, that a first directory and the sub-root directory are subdirectories of the $i^{th}$-level directory, wherein the first directory is between the sub-root directory of the respective subdirectory tree and the $i^{th}$-level directory, and determining, according to the parent directory path information of the sub-root directory of the respective subdirectory tree, that a directory higher than the $i^{th}$-level directory is parent directory of the $i^{th}$-level directory;
wherein i is an integer greater than or equal to 1 and less than or equal to R.

20. The non-transitory computer-readable storage medium according to claim 17, wherein in the one directory tree, in a directory lower than an $S^{th}$-level directory, parent directory path information of each directory comprises information about a higher-level directory of a level S, wherein S is an integer greater than or equal to 2; and
wherein, in the one directory tree, parent directory path information of the $S^{th}$-level directory and a directory higher than the $S^{th}$-level directory comprises information about all higher-level directories.

21. The non-transitory computer-readable storage medium according to claim 17, wherein
in the one directory tree, a first directory of the plurality of directories is included in a level S, a second directory of the plurality of directories is included in the level S, a third directory of the plurality of directories in included in a level S-1 that is higher than the level S, and a fourth directory of the plurality of directories in included in a level S+X that is lower than the level S, where S is an integer greater than or equal to 2 and X is an integer greater than or equal to 1, a first subdirectory tree of the N subdirectory trees comprises the second directory and the third directory, and is free from including the first directory, and a second subdirectory tree of the N subdirectory trees comprises the fourth directory and is free from having the first directory, the second directory and the third directory.

* * * * *